US008745627B2

(12) United States Patent
Anderson

(10) Patent No.: US 8,745,627 B2
(45) Date of Patent: Jun. 3, 2014

(54) SYSTEM AND METHOD OF CONTROLLING POWER IN A MULTI-THREADED PROCESSOR

(75) Inventor: William C. Anderson, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 1892 days.

(21) Appl. No.: 11/167,973

(22) Filed: Jun. 27, 2005

(65) Prior Publication Data

US 2006/0294520 A1    Dec. 28, 2006

(51) Int. Cl.
*G06F 9/46* (2006.01)

(52) U.S. Cl.
USPC ......................................................... 718/104

(58) Field of Classification Search
USPC ......................................................... 718/104
See application file for complete search history.

(56) References Cited

U.S. PATENT DOCUMENTS

| | | | |
|---|---|---|---|
| 4,845,419 A | 7/1989 | Hacker | |
| 5,664,215 A * | 9/1997 | Burgess et al. | 712/23 |
| 5,675,812 A * | 10/1997 | Nagashige et al. | 713/322 |
| 6,088,809 A * | 7/2000 | Atkinson | 713/324 |
| 6,269,043 B1 * | 7/2001 | Batcher | 365/227 |
| 6,687,838 B2 | 2/2004 | Orenstien et al. | |
| 6,889,331 B2 * | 5/2005 | Soerensen et al. | 713/320 |
| 6,981,163 B2 | 12/2005 | Toll et al. | |
| 7,055,151 B1 * | 5/2006 | Joffe et al. | 718/104 |
| 7,111,182 B2 * | 9/2006 | Gary | 713/324 |
| 7,117,377 B2 * | 10/2006 | Hagiwara et al. | 713/300 |
| 7,197,652 B2 | 3/2007 | Keller, Jr. et al. | |
| 7,269,752 B2 * | 9/2007 | John | 713/324 |
| 7,287,175 B2 * | 10/2007 | Vereen et al. | 713/323 |
| 7,313,671 B2 * | 12/2007 | Leijten | 712/24 |
| 7,401,333 B2 * | 7/2008 | Vandeweerd | 718/102 |
| 7,657,767 B2 * | 2/2010 | Rusu et al. | 713/323 |
| 2002/0194249 A1 * | 12/2002 | Hsieh | 709/103 |
| 2003/0145135 A1 * | 7/2003 | Kang | 710/1 |
| 2004/0073773 A1 * | 4/2004 | Demjanenko | 712/7 |

FOREIGN PATENT DOCUMENTS

EP          0947926 A2     10/1999

OTHER PUBLICATIONS

International Search Report PCT/US2006/025299, International Search Authority—European Patent Office—Oct. 29, 2007.

(Continued)

*Primary Examiner* — Gregory A Kessler
(74) *Attorney, Agent, or Firm* — Peter Michael Kamarchik; Nicholas J. Pauley; Joseph Agusta

(57) ABSTRACT

A multithreaded processor device is disclosed and includes a plurality of execution units to execute a plurality of program threads and includes a global low power detection circuit. The global low power detection circuit includes an input that is responsive to each of the plurality of program threads. The input indicates an execution activity level for each of the plurality of program threads. The global low power detection circuit further comprises logic to evaluate the activity level of each of the plurality of program threads. The logic provides a power level signal. Additionally, the global low power detection circuit includes an output that is responsive to the power level signal. The output is coupled to one or more global resources within the multithreaded processor and the output selectively controls an amount of power provided to the one or more global resources.

47 Claims, 12 Drawing Sheets

(56) References Cited

OTHER PUBLICATIONS

Uhrig S. et al. "Hardware-Based Power Management for Real-Time Applications", Parallel and Distributing Computing, 2003 Proceedings Second International Symposium on Oct. 13-14, 2003, Piscataway, NJ, USA, IEEE pp. 258-265, XP010683203, ISBN: 0-7695-2069.

Written Opinion—PCT/US06/025299, International Search Authority—European Patent Office—Oct. 29, 2007.

* cited by examiner

SYSTEM AND METHOD OF CONTROLLING POWER IN A MULTI-THREADED PROCESSOR

BACKGROUND

I. Field

The present disclosure generally relates to digital signal processors and devices that use such processors. More particularly, the disclosure relates to controlling the power of one or more resources within a digital signal processor or connected to a digital signal processor.

II. Description of Related Art

Advances in technology have resulted in smaller and more powerful personal computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and IP telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can include a web interface that can be used to access the Internet. As such, these wireless telephones include significant computing capabilities.

Typically, as these devices become smaller and more powerful, they become increasingly resource constrained. For example, the screen size, the amount of available memory and file system space, and the amount of input and output capabilities may be limited by the small size of the device. Further, the battery size, the amount of power provided by the battery, and the life of the battery is also limited. Often, even though a device in which a digital signal processor is incorporated is in a standby mode and powered down, leakage can occur at the digital signal processor. In other words, one or more components within the digital signal processor or coupled to the digital signal processor may continue to drain energy from the battery.

Accordingly, it would be advantageous to provide an improved method of controlling power within a digital signal processor.

SUMMARY

A multithreaded processor device is disclosed and includes a plurality of execution units to execute a plurality of program threads and includes a global low power detection circuit. The global low power detection circuit includes an input that is responsive to each of the plurality of program threads. The input indicates an execution activity level for each of the plurality of program threads. The global low power detection circuit further comprises logic to evaluate the activity level of each of the plurality of program threads and the logic provides a power level signal. Additionally, the global low power detection circuit includes an output that is responsive to the power level signal. The output is coupled to one or more global resources within the multithreaded processor and the output selectively controls an amount of power provided to the one or more global resources.

In a particular embodiment, each input associated with the plurality of program threads indicates that an associated program thread is in a sleep mode or in an active mode. Further, in a particular embodiment, the output is a global power off signal that turns off the power to the one or more global resources after the logic determines that each of the plurality of program threads is in a sleep mode.

In another particular embodiment, the input for each of the plurality of program threads indicates that each of the programs threads is going into the sleep mode for a number of clock cycles. Moreover, the global low power detection circuit outputs a global power off signal when all of the threads are going into the sleep mode for a number of clock cycles and when a lowest number of the clock cycles for which a program thread will remain in the sleep mode is above a predetermined threshold.

In yet another particular embodiment, the device also comprises a memory and a plurality of instructions for each of the plurality program threads is stored within the memory. A sequencer is coupled to the memory. The sequencer fetches the plurality of instructions for each of the plurality of program threads from the memory and transmits the plurality of instructions to at least one of the plurality of execution units. In a particular embodiment, the sequencer supports very long instruction word (VLIW) type instructions. Also, in a particular embodiment, the sequencer further supports execution of superscalar type instructions.

In a particular embodiment, at least one of the plurality of execution units is a multiplication and accumulation (MAC) type execution unit. Additionally, at least one of the plurality of instruction execution units is a data load-store type instruction execution unit.

In another embodiment, a low power multithreaded processor device is disclosed and includes a plurality of local resources, a plurality of global resources, and a plurality of program threads. Each of the plurality of program threads utilizes at least one of the plurality of local resources and at least one of the plurality of global resources. Further, the low power multithreaded processor device includes a global low power detection circuit that is coupled to the plurality of global resources. The global low power detection circuit is responsive to the plurality of program threads in order to selectively turn off the power to the plurality of global resources when all program threads are in a sleep mode.

In yet another embodiment, a method of controlling power that is applied to one or more global resources within a multithreaded processor is disclosed and includes receiving an input from each of a plurality of program threads and selectively controlling the power that is applied to the one or more global resources, based on the input from the plurality of program threads.

In still another embodiment, a method of controlling power to one or more global resources within a multithreaded processor is disclosed and includes receiving an indication from each of a plurality of program threads at a low power detection circuit that each of the plurality of program threads is going to sleep for a number of clock cycles, determining a minimum number of clock cycles that any of the plurality of program threads is to sleep, and storing that minimum number of clock cycles in a register. Further, the method includes turning the power off to the one or more global resources, decrementing a clock counter starting from the minimum number of clock cycles stored in the register, and restoring the power to the one or more global resources prior to the clock counter reaching zero.

In yet still another embodiment, a method of debugging a multithreaded digital signal processor is provided and includes placing a device incorporating the multithreaded digital signal processor in a standby mode, monitoring an output from a global low power detection circuit responsive to a plurality of program threads of the multithreaded digital signal processor, and monitoring whether a global power off signal is output by the output of the global low power detection circuit.

In another embodiment, a system for debugging a multi-threaded digital signal processor is disclosed and includes a computer and a Joint Test Action Group (JTAG) interface at the computer. The JTAG interface at the computer is coupled to a JTAG interface which is, in turn, coupled to the multi-threaded digital signal processor. Further, the JTAG interface at the computer is configured to receive a global power off signal from a global low power detection circuit within the multithreaded digital signal processor. Also, the JTAG interface at the computer is configured to receive a low power state signal from each of the plurality of program threads. The low power state signal indicates whether an associated program thread is in a sleep mode or not in a sleep mode.

In still another embodiment, a portable communication device is provided and includes a digital signal processor and a peripheral device that is external to the digital signal processor and that is coupled to the digital signal processor. In this embodiment, the digital signal processor includes a plurality of program threads, a plurality of global resources, and a global low power detection circuit that receives an input signal associated with each of the plurality of program threads and outputs a signal to the plurality of global resources. The global low power detection circuit outputs a global power off signal to turn off the power to the plurality of global resources based on the input signals for the plurality of program threads. In this embodiment, the input signals for each of the plurality of program threads indicates that each of the plurality of program threads is in a sleep mode. Additionally, the digital signal processor outputs a system power off signal to the peripheral device.

In yet another embodiment, a global low power detection circuit within a multithreaded processor is disclosed and includes means for receiving an input associated with each of a plurality of program threads and means for selectively controlling the power applied to the one or more global resources, based on the input from the plurality of program threads.

In another embodiment, a global low power detection circuit within a multithreaded processor is provided and includes means for receiving an indication for each of a plurality of program threads at a low power detection circuit that each of the plurality of program threads is going to sleep for a number of clock cycles. Further, the global low power detection circuit includes means for determining a minimum number of clock cycles that any of the plurality of program threads is to sleep, means for storing that minimum number of clock cycles in a register, and means for turning the power off to the one or more global resources. Additionally, the global low power detection circuit includes means for decrementing a clock counter starting from the minimum number of clock cycles stored in the register and means for restoring the power to the one or more global resources prior to the clock counter reaching zero.

In yet another embodiment, a debugging device is disclosed and includes means for monitoring an output from a global low power detection circuit responsive to a plurality of program threads of the multithreaded digital signal processor and means for monitoring whether a global power off signal is output by the output of the global low power detection circuit.

An advantage of one or more embodiments disclosed herein can include powering off one or more components within a digital signal processor when a device in which the digital signal processor is incorporated is in a standby mode.

Another advantage of one or more embodiments disclosed herein can include powering off one or more components coupled to a digital signal processor when a device in which the digital signal processor is incorporated is in a standby mode.

Still another advantage can include determining whether a global low power detection circuit within a digital signal processor outputs a global power off signal during operation.

Still another advantage can include determining whether one or more program threads executed by a multithreaded digital signal processor enters a sleep mode during operation.

Yet another advantage can include turning the power on to one or more components within the digital signal processor before the component requires the power to allow a power capacitor to reach a full charge.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

The aspects and the attendant advantages of the embodiments described herein will become more readily apparent by reference to the following detailed description when taken in conjunction with the accompanying drawings wherein.

DETAILED DESCRIPTION

Figure 1:
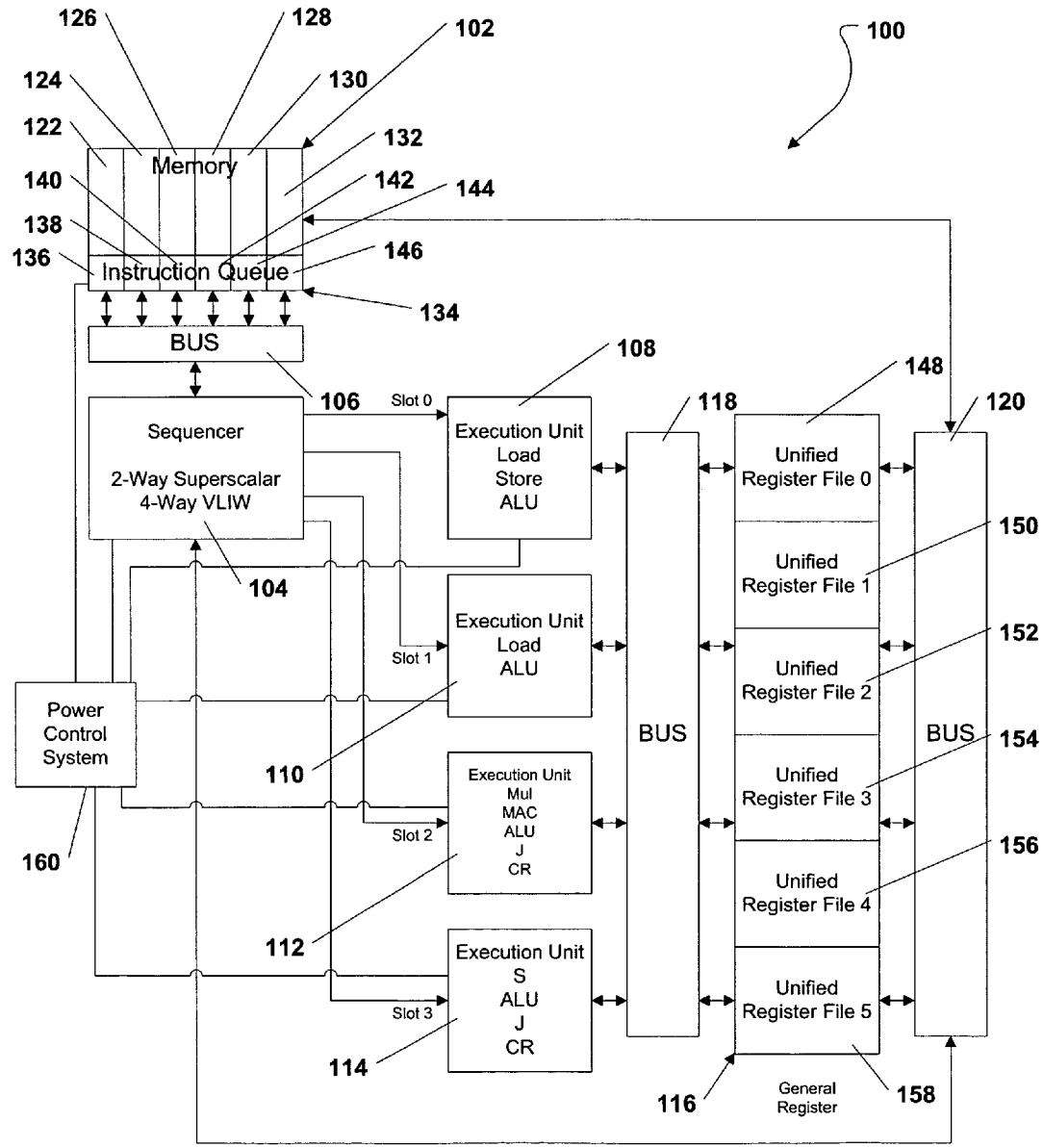
FIG. 1 is a general diagram of an exemplary digital signal processor.

FIG. 1 illustrates a block diagram of an exemplary, non-limiting embodiment of a digital signal processor (DSP) 100. As illustrated in FIG. 1, the DSP 100 includes a memory 102 that is coupled to a sequencer 104 via a bus 106. In a particular embodiment, the bus 106 is a sixty-four (64) bit bus and the sequencer 104 is configured to retrieve instructions having a length of thirty-two (32) bits from the memory 102. The sequencer 104 is coupled to a first instruction execution unit 108, a second instruction execution unit 110, a third instruction execution unit 112, and a fourth instruction execution unit 114. FIG. 1 indicates that each instruction execution unit 108, 110, 112, 114 can be coupled to a general register file 116 via a first bus 118. The general register file 116 can also be coupled to the sequencer 104 and the memory 102 via a second bus 120.

In a particular embodiment, the memory 102 includes a first instruction cache 122, a second instruction cache 124, a third instruction cache 126, a fourth instruction cache 128, a fifth instruction cache 130, and a sixth instruction cache 132. During operation, the instruction caches 122, 124, 126, 128, 130, 132 can be accessed independently of each other by the sequencer 104. Additionally, in a particular embodiment, each instruction cache 122, 124, 126, 128, 130, 132 includes a plurality of instructions, instruction steering data for each instruction, and instruction pre-decode data for each instruction.

As illustrated in FIG. 1, the memory 102 can include an instruction queue 134 that includes an instruction queue for each instruction cache 122, 124, 126, 128, 130, 132. In particular, the instruction queue 134 includes a first instruction queue 136 that is associated with the first instruction cache 122, a second instruction queue 138 that is associated with the second instruction cache 124, a third instruction queue 140 that is associated with the third instruction cache 126, a fourth instruction queue 142 that is associated with the fourth instruction cache 128, a fifth instruction queue 144 that is associated with the fifth instruction cache 130, and a sixth instruction queue 146 that is associated with the sixth instruction cache 132.

During operation, the sequencer 104 can fetch instructions from each instruction cache 122, 124, 126, 128, 130, 132 via the instruction queue 134. In a particular embodiment, the sequencer 104 fetches instructions from the instruction queues 136, 138, 140, 142, 144, 146 in order from the first instruction queue 136 to the sixth instruction queue 146. After fetching an instruction from the sixth instruction queue 146, the sequencer 104 returns to the first instruction queue 136 and continues fetching instructions from the instruction queues 136, 138, 140, 142, 144, 146 in order.

In a particular embodiment, the sequencer 104 operates in a first mode as a 2-way superscalar sequencer that supports superscalar instructions. Further, in a particular embodiment, the sequencer also operates in a second mode that supports very long instruction word (VLIW) instructions. In particular, the sequencer can operate as a 4-way VLIW sequencer. In a particular embodiment, the first instruction execution unit 108 can execute a load instruction, a store instruction, and an arithmetic logic unit (ALU) instruction. The second instruction execution unit 110 can execute a load instruction and an ALU instruction. Also, the third instruction execution unit can execute a multiply instruction, a multiply-accumulate instruction (MAC), an ALU instruction, a program redirect construct, and a transfer register (CR) instruction. FIG. 1 further indicates that the fourth instruction execution unit 114 can execute a shift (S) instruction, an ALU instruction, a program redirect construct, and a CR instruction. In a particular embodiment, the program redirect construct can be a zero overhead loop, a branch instruction, a jump (J) instruction, etc.

As depicted in FIG. 1, the general register 116 includes a first unified register file 148, a second unified register file 150, a third unified register file 152, a fourth unified register file 154, a fifth unified register file 156, and a sixth unified register file 158. Each unified register file 148, 150, 152, 154, 156, 158 corresponds to an instruction cache 122, 124, 126, 128, 130, 132 within the memory 102. Further, in a particular embodiment, each unified register file 148, 150, 152, 154, 156, 158 has the same construction and includes an equal number of data or address operands.

During operation of the DSP 100, instructions are fetched from the memory 102 by the sequencer 104, sent to designated instruction execution units 108, 110, 112, 114, and executed at the instruction execution units 108, 110, 112, 114. The results at each instruction execution unit 108, 110, 112, 114 can be written to the general register 116, i.e., to one of the unified register files 148, 150, 152, 154, 156, 158.

FIG. 1 also indicates that the DSP 100 can include a power control system 160 that can be used to control the power within the DSP 100. As shown, the power control system 160 can be coupled to the memory 102, the sequencer 104, and each of the instruction execution units 108, 110, 112, 114. Further, the power control system 160 can be coupled to other components within the DSP 100, or coupled to the DSP 100, that consume power.

Figure 2:
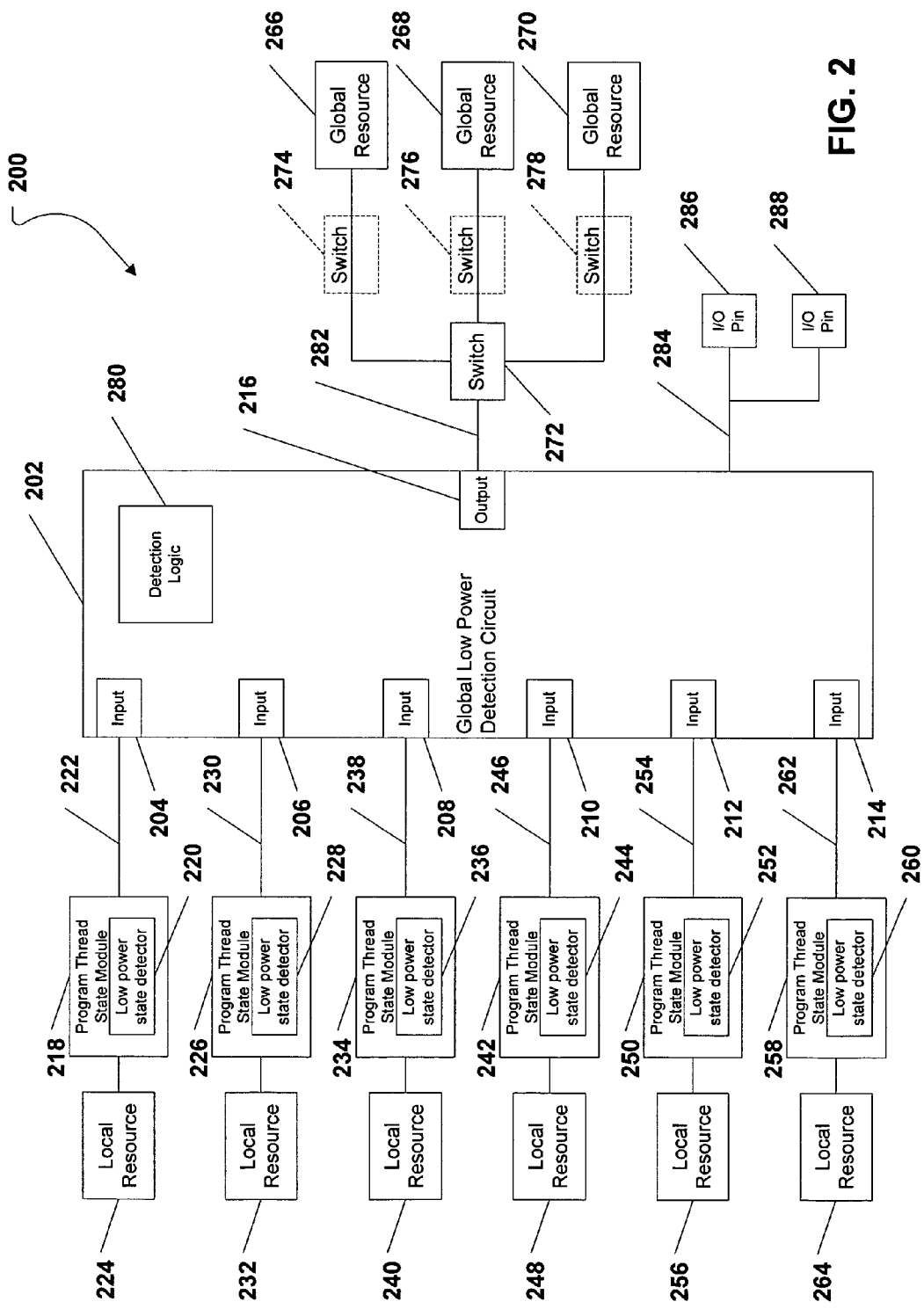
FIG. 2 is a general diagram of a global low power detection circuit that can be included within the digital signal processor shown in FIG. 1.

Referring to FIG. 2, a power control system is shown and is generally designated 200. The power control system 200 shown in FIG. 2 is an exemplary, non-limiting embodiment of the power control system 160 described in conjunction with FIG. 1. In a particular embodiment, the power control system 200 can be used to control the power within a multi-threaded DSP, e.g., the multi-threaded DSP 100 shown in FIG. 1. As depicted in FIG. 2, the system 200 includes a global low power detection circuit (GLPDC) 202. In a particular embodiment, the GLPDC 202 includes a first input 204, a second input 206, a third input 208, a fourth input 210, a fifth input 212, and a sixth input 214. Additionally, in a particular embodiment, the GLPDC 202 includes an output 216.

FIG. 2 indicates that a first program thread state module 218 is coupled to the GLPDC 202, e.g., to the first input 204 of the GLPDC 202. As shown, the first program thread state module 218 includes a low power state detector 220 that outputs a state signal 222 to the GLPDC 202. In a particular embodiment, the state signal 222 indicates whether or not a first program thread associated with the first program thread state module 218 is in a sleep mode. Further, in a particular embodiment, the first program thread state module 218 is coupled to at least one local resource 224.

As shown in FIG. 2, a second program thread state module 226 is coupled to the GLPDC 202, e.g., to the second input 206 of the GLPDC 202. As shown, the second program thread state module 226 includes a low power state detector 228 that outputs a state signal 230 to the GLPDC 202. In a particular embodiment, the state signal 230 indicates whether or not a second program thread associated with the second program thread state module 226 is in a sleep mode. Further, in a particular embodiment, the second program thread state module 226 is coupled to at least one local resource 232.

FIG. 2 also depicts a third program thread state module 234 that is coupled to the GLPDC 202, e.g., to the third input 208 of the GLPDC 202. As shown, the third program thread state module 234 includes a low power state detector 236 that outputs a state signal 238 to the GLPDC 202. In a particular embodiment, the state signal 238 indicates whether or not a third program thread associated with the third program thread state module 234 is in a sleep mode. Further, in a particular embodiment, the third program thread state module 234 is coupled to at least one local resource 240.

As illustrated in FIG. 2, a fourth program thread state module 242 is coupled to the GLPDC 202, e.g., to the fourth input 210 of the GLPDC 202. As shown, the fourth program thread state module 242 includes a low power state detector 244 that outputs a state signal 246 to the GLPDC 202. In a particular embodiment, the state signal 246 indicates whether or not a fourth program thread associated with the fourth program thread state module 242 is in a sleep mode. Further, in a particular embodiment, the fourth program thread state module 242 is coupled to at least one local resource 248.

FIG. 2 indicates that a fifth program thread state module 250 is coupled to the GLPDC 202, e.g., to the fifth input 212 of the GLPDC 202. As shown, the fifth program thread state module 250 includes a low power state detector 252 that outputs a state signal 254 to the GLPDC 202. In a particular embodiment, the state signal 254 indicates whether or not a fifth program thread associated with the fifth program thread state module 250 is in a sleep mode. Further, in a particular embodiment, fifth the program thread state module 250 is coupled to at least one local resource 256.

Additionally, as depicted in FIG. 2, a sixth program thread state module 258 is coupled to the GLPDC 202, e.g., to the sixth input 214 of the GLPDC 202. As shown, the sixth program thread state module 258 includes a low power state detector 260 that outputs a state signal 262 to the GLPDC 202. In a particular embodiment, the state signal 262 indicates whether or not a sixth program thread associated with the sixth program thread state module 258 is in a sleep mode. Further, in a particular embodiment, the sixth program thread state module 258 is coupled to at least one local resource 264.

As illustrated in FIG. 2, a first global resource 266, a second global resource 268, and a third global resource 270 is coupled to the GLPDC 202, e.g., to the output 216 of the GLPDC 202. In a particular embodiment, the global resources 268, 270, 272 can include instruction execution units, data caches, instruction caches, clock trees, etc. In a particular embodiment, a single, centralized switch 272 is installed between the global resources 268, 270, 272 and the GLPDC 202. In an alternative embodiment, a plurality of distributed switches, e.g., a first distributed switch 274, a second distributed switch 276, and a third distributed switch 278 (shown in dashed lines), are installed between the GLPDC 202 and the global resources 268, 270, 272. For example, the first distributed switch 274 is coupled to the first global resource 266 between the first global resource 266 and the GLPDC 202, the second distributed switch 276 is coupled to the second global resource 268 between the second global resource 268 and the GLPDC 202, and the third distributed switch 278 is coupled to the third global resource 270 between the third global resource 270 and the GLPDC 202.

Figure 3:
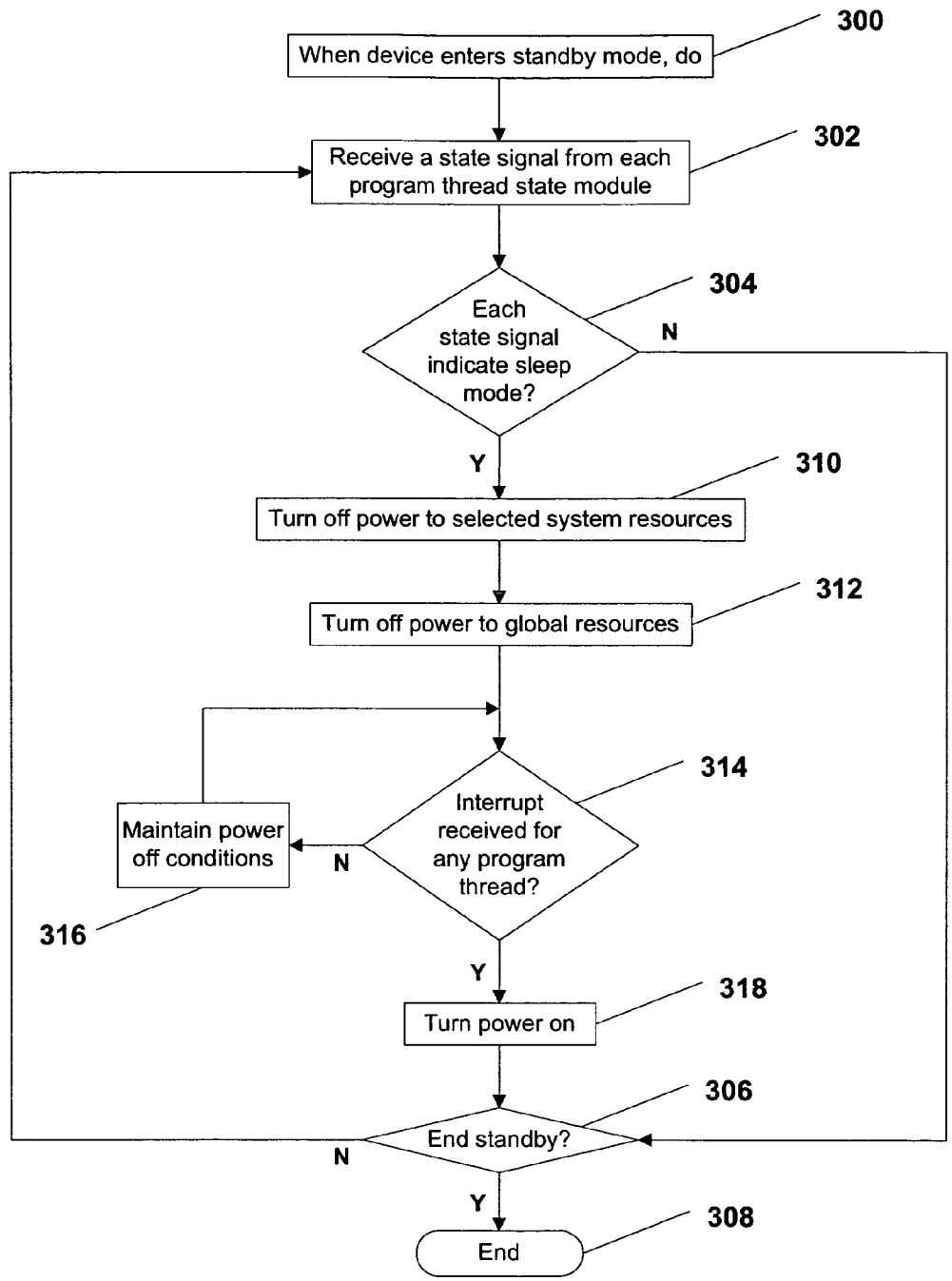
FIG. 3 is a flow chart illustrating a method of controlling power within the digital signal processor shown in FIG. 1.

In a particular embodiment, the GLPDC 202 includes detection logic 280 that can be used to detect when each of the program thread state modules 218, 226, 234, 242, 250, 258 indicate that the associated program threads are in a sleep mode. If all of the associated program threads are in a sleep mode the GLPDC 202 can output a global low power off signal 282 to the single, centralized switch 272 in order to de-energize the global resources 266, 268, 270. In an alternative embodiment, the GLPDC 202 can output the global low power off signal 282 to each of the distributed switches 274, 276, 278 in order to de-energize the global resources 266, 268, 270. In an alternative embodiment, the GLPDC 202 can output a system power off signal 284 to one or more input/output pins 286, 288 in order to turn the power off to one or more selected peripheral components coupled to the digital signal processor in which the GLPDC 202 is installed. In an illustrative embodiment, the peripheral components can include a display controller, a touchscreen controller, a universal serial bus controller, an audio coder/decoder (CODEC), a voice coder/decoder (CODEC), a modulator/demodulator (MODEM) for wireless communications, a memory, and an input device Referring to FIG. 3, a method of controlling power within a digital signal processor (DSP) is shown and commences at block 300. At block 300, when a device in which the DSP is incorporated enters standby mode, the following steps are performed. At block 302, a global low power detection circuit within the DSP receives a state signal from each program thread state module. At decision step 304, the global low power detection circuit determines whether each state signal from each program thread state module indicates that each program thread is in a sleep mode. If not, the method proceeds to decision step 306 and the global low power detection circuit determines whether the device has gone out of a standby mode. If so, the method ends at state 308. If the device has not gone out of standby mode, the method returns to block 302 and continues as described.

Returning to decision step 304, if each state signal indicates that each program thread is in a sleep mode, the method moves to block 310. At block 310, the global low power detection circuit turns off the power to selected system resources. In a particular embodiment, the global low power detection circuit turns off the power to the selected system resources by turning off the power to selected input/output pins within the digital signal processor that are coupled to the selected system resources. Moving to block 312, the global low power detection circuit turns off the power to one or more global resources. In a particular embodiment, the global low power detection circuit turns off the power to the global resources by outputting a global power off signal to a centralized switch that is coupled to each of the global resources. In an alternative embodiment, the global low power detection circuit turns off the power to the global resources by outputting a global power off signal to a plurality of distributed switches that are coupled to respective global resources.

Proceeding to decision step 314, the global low power detection circuit determines whether an interrupt request is received for any program thread. If not, the method moves to block 316 and the global low power detection circuit maintains the power off conditions. The method then returns to decision step 314. At decision step 314, if an interrupt request is received for any of the program threads, the method continues to block 318 and the power to the global resources is turned on. The method then moves to decision step 306 and continues as described above.

Figure 4:
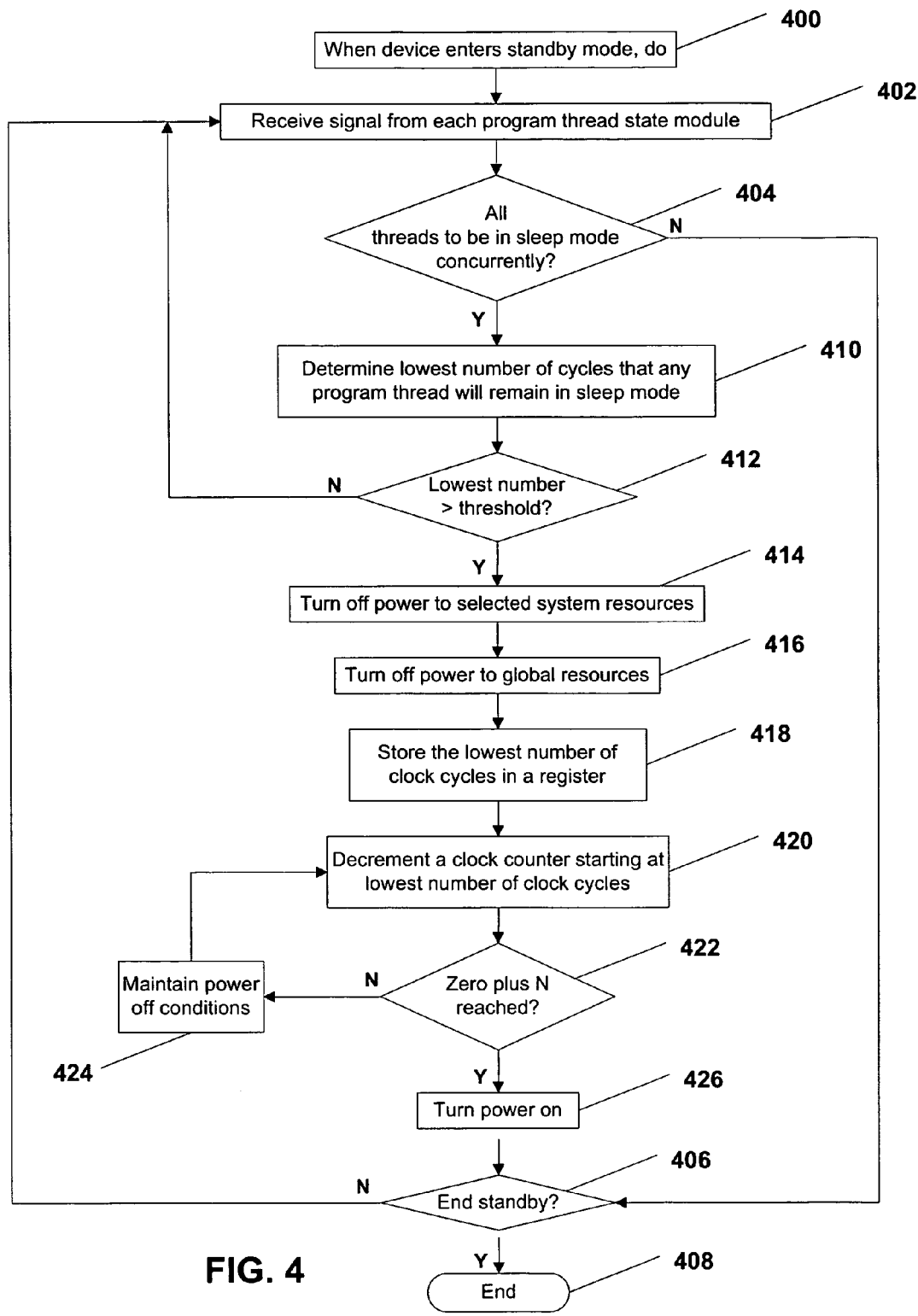
FIG. 4 is a flow chart illustrating an alternative method of controlling power within the digital signal processor shown in FIG. 1.

FIG. 4 depicts an alternative method of controlling power within a digital signal processor (DSP). Beginning at block 400, when a device in which the DSP is incorporated enters standby mode, the following steps are performed. At block 402, a global low power detection circuit within the DSP receives a state signal from each of a plurality of program thread state modules. At decision step 404, the global low power detection circuit determines whether the state signals from the program thread state modules indicate that all of the program threads are going to be in a sleep mode concurrently. If not, the method proceeds to decision step 406 and the global low power detection circuit determines whether the device has gone out of standby mode. If so, the method ends at state 408. If the device has not gone out of standby mode, the method returns to block 402 and continues.

Returning to decision step 404, if the state signals indicate that the program thread are to be in the sleep mode concurrently, the method moves to block 410. At block 410, the global low power detection circuit determines the lowest number of cycles that any of the program threads will remain in a sleep mode. In a particular embodiment, number of clock cycles that indicate the duration of the sleep mode for each of the threads is determined by a program control. Moving to decision step 412, the global low power detection circuit determines whether the lowest number of sleep clock cycles is greater than a threshold, e.g., one thousand clock cycles. If not, the method returns to block 402 and continues as described herein. On the other hand, if the lowest number of sleep clock cycles is greater than the threshold, the method moves to block 414.

At block 414, the global low power detection circuit turns off the power to selected system resources. In particular embodiment, the global low power detection circuit turns off the power to the selected system resources by turning off the power to selected input/output pins within the digital signal processor that are coupled to the selected system resources. Moving to block 416, the global low power detection circuit turns off the power to one or more global resources. In a particular embodiment, the global low power detection circuit turns off the power to the global resources by outputting a global power off signal to a centralized switch that is coupled to each of the global resources. In an alternative embodiment, the global low power detection circuit turns off the power to the global resources by outputting a global power off signal to a plurality of distributed switches that are coupled to respective global resources At block 418, the global low power detection circuit stores the lowest number of sleep clock cycles in a control register.

Moving to block 420, a clock counter is decremented starting at the lowest number of sleep clock cycles. At decision step 422, the global low power detection circuit determines whether zero plus N has been reached wherein N is a number of cycles need to turn on a global resource before use. If zero plus N is not reached, the method proceeds to block 424 and the global low power detection circuit maintains the power off conditions. When zero plus N is reached, the method continues to block 426 and the global low power detection circuit turns the power to the global resources and system resources on. Thereafter, the method moves to decision step 406 and continues as described herein.

In a particular embodiment, N is one hundred clock cycles. However, N can be any other number of clock cycles. Further, in a particular embodiment, by turning on the power to the global resources before the counter reaches zero it allows a power capacitor to reach a full charge before the global resource needs full power. Thus, the latency due to the power capacitor reaching full charge is reduced or substantially eliminated.

Figure 5:
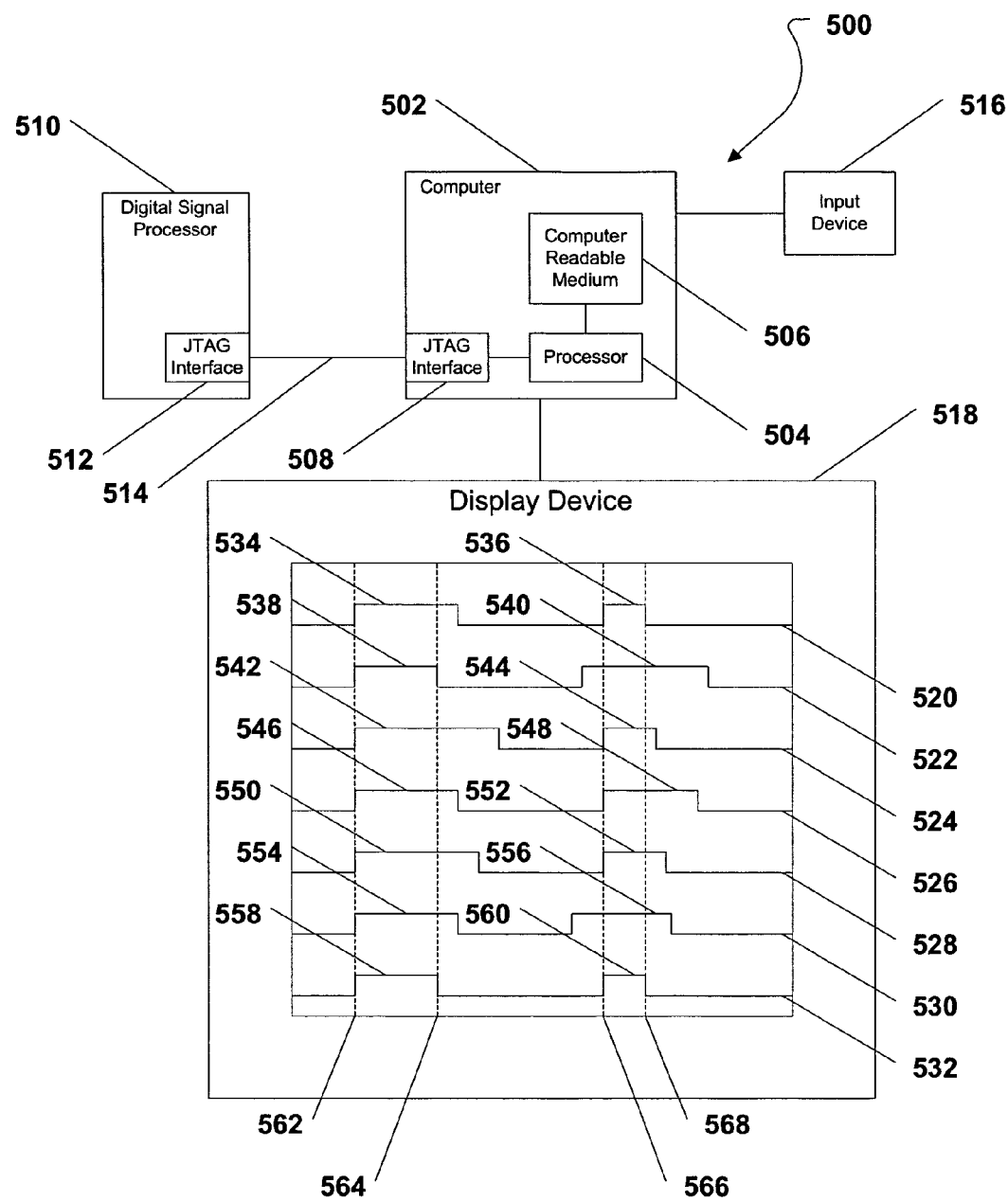
FIG. 5 is a general diagram of a system of debugging a digital signal processor.

Referring to FIG. 5, a system for debugging a digital signal processor is shown and is designated 500. As shown, the system 500 includes a computer 502. In an illustrative embodiment, the computer 502 includes a processor 504 and a computer readable medium 506 that is accessible to the processor 504. FIG. 5 also shows a Joint Action Testing Group (JTAG) interface 508 that is coupled to the processor 504.

As shown in FIG. 5, a digital signal processor (DSP) 510, e.g., a multi-threaded DSP, is coupled to the computer 502. In a particular embodiment, the DSP 510 includes a JTAG interface 512 that is coupled to the JTAG interface 508 of the computer 502. In a particular embodiment, an output signal 514 from the DSP 510 is transmitted from the DSP 510 to the computer 502, e.g., from the JTAG interface 512 of the DSP 510 to the JTAG interface 508 of the computer 502. In a particular embodiment, the output signal 514 includes a first thread state signal, a second thread state signal, a third thread state signal, a fourth thread state signal, a fifth thread state signal, and a sixth thread state signal. Further, the output signal 514 includes a global power off signal. FIG. 5 also shows an input device 516 and a display device 518 that are coupled to the computer 502.

In a particular embodiment, the output signal 514 from the DSP 510 can be processed by the computer 502 to yield a first thread state signal plot 520, a second thread state signal plot 522, a third thread state signal plot 524, a fourth thread state signal plot 526, a fifth thread state signal plot 528, and a sixth thread state signal plot 530. The output signal 514 from the DSP 510 can also be processed by the computer 502 to yield a global power off signal plot 532.

In an illustrative embodiment, the first thread state signal plot 520 includes a first sleep mode portion 534 and a second sleep mode portion 536. Further, in an illustrative embodiment, the second thread state signal plot 522 includes a first sleep mode portion 538 and a second sleep mode portion 540. Also, in an illustrative embodiment, the third thread state signal plot 524 includes a first sleep portion 542 and a second sleep portion 544. In an illustrative embodiment, the fourth thread state signal plot 526 includes a first sleep portion 546 and a second sleep portion 548. Additionally, in an illustrative embodiment, the fifth thread state signal plot 528 includes a first sleep portion 550 and a second sleep portion 552. Moreover, in an illustrative embodiment, the sixth thread state signal plot 530 includes a first sleep portion 554 and a second sleep portion 556.

In an illustrative embodiment, the global power off signal plot 532 includes a first power off portion 558 and a second power off portion 560. As shown in FIG. 5, in an illustrative embodiment, the first power off portion 558 of the global power off signal plot 532 includes a first start 562 that occurs when all thread state signal plots 520, 522, 524, 526, 528, 530 enter the first sleep mode portion 534, 538, 542, 546, 550, 554. Moreover, the first power off portion 558 of the global power off signal plot 532 includes a first stop 564 that occurs when one of the thread state signals indicates that an associated program thread has exited the sleep mode. In FIG. 5, the first stop 564 corresponds to the end of the first sleep portion 538 of the second thread state signal plot 522.

Additionally, in an illustrative embodiment, the second power off portion 560 of the global power off signal plot 532 includes a second start 566 that occurs when all thread state signal plots 520, 522, 524, 526, 528, 530 enter the second sleep mode portion 536, 540, 544, 550, 554, 558. Moreover, the second power off portion 560 of the global power off signal plot 532 includes a second stop 568 that occurs when one of the thread state signals indicates that an associated program thread has exited the sleep mode. In FIG. 5, the second stop 568 corresponds to the end of the second sleep portion 536 of the first thread state signal plot 520.

As described in detail below, the system 500 can be used to debug a DSP. For example, if the global power off signal plot 532 remains flat, indicating that the global power off signal is not output by the digital signal processor, a user can review the thread state signal plots 520, 522, 524, 526, 528, 530 in order to determine if any of the corresponding program threads are not entering the sleep mode. Thus, the user can determine which program may need to be modified so that it will, occasionally, enter sleep mode while an electronic device that incorporates the digital signal processor 510 is in a standby mode.

Figure 6:
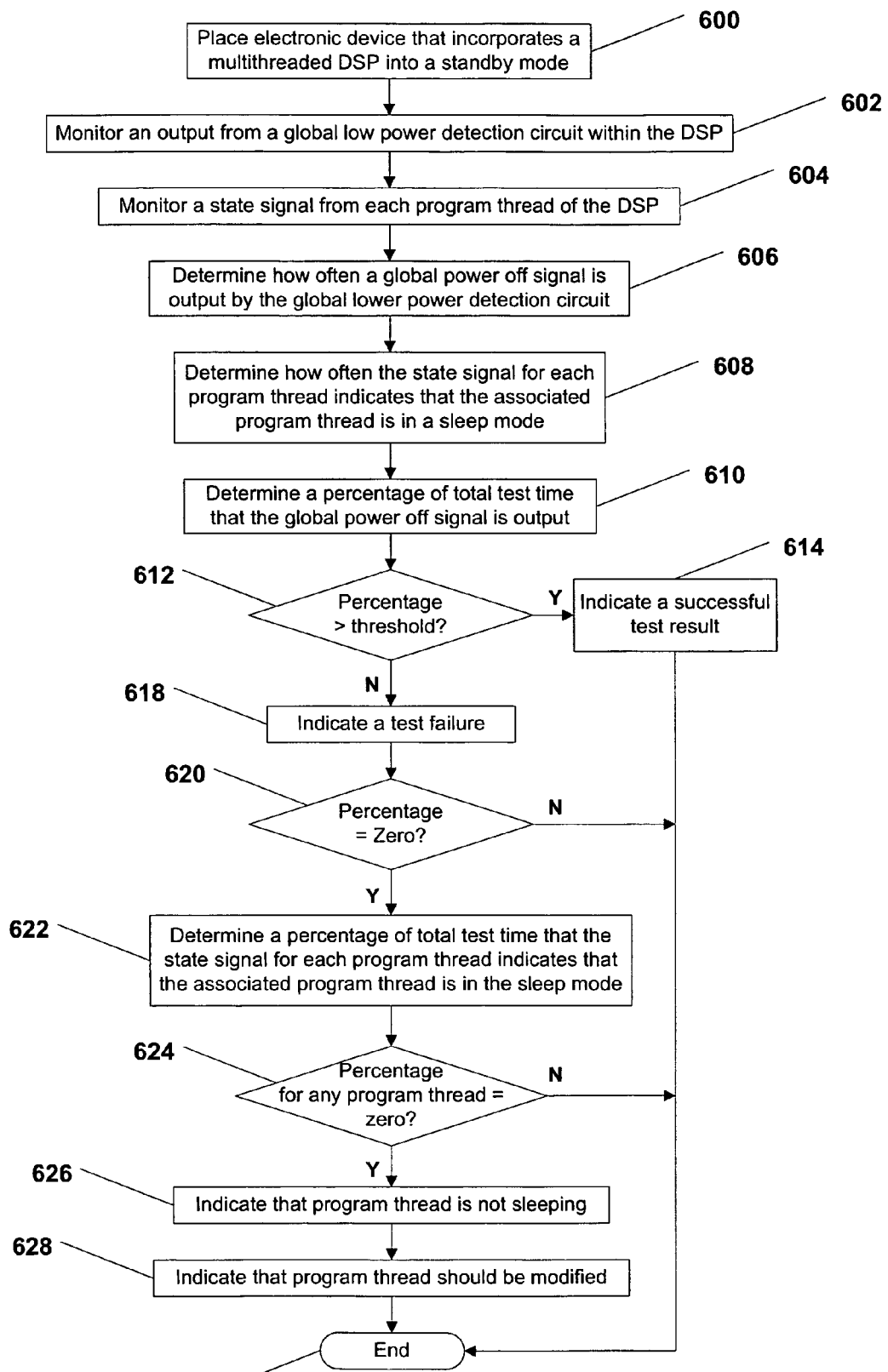
FIG. 6 is a flow chart illustrating a method of debugging a digital signal processor.

Referring to FIG. 6, a method of debugging a multi-threaded DSP is shown and commences at block 600. At block 600, a computer places an electronic device that incorporates a multithreaded DSP into a standby mode. At block 602, a computer monitors an output from a global low power detection circuit within the DSP. Moving to block 604, the computer monitors a state signal from each program thread of the DSP. At block 606, the computer determines how often a global power off signal is output by the global lower power detection circuit. Thereafter, at block 608, the computer determines how often the state signal for each program thread indicates that the associated program thread is in a sleep mode.

At block 610, the computer determines a percentage of total test time that the global power off signal is output. Moving to decision step 612, the computer determines whether the percentage of total test time that the global power off signal is output is greater than a threshold. If so, the method continues to block 614 and the computer indicates a successful test result. The method then ends at step 616.

Returning to decision step 612, if the percentage of total test time that the global power off signal is output is not greater than the threshold, the method proceeds to block 618 and the computer indicates a test failure. Thereafter, at decision step 620, the computer determines whether the percentage of total test time that the global power off signal is output is equal to zero. If not, the method ends at state 616. On the other hand, if the percentage of total test time that the global power off signal is output is not equal to zero, the method proceeds to block 622. At block 622, the computer determines a percentage of total test time that the state signal for each program thread indicates that the associated program thread is in the sleep mode.

Continuing to decision step 624, the computer determines whether the percentage of total test time that the state signal for any program thread indicates that the associated program thread is in sleep mode is equal to zero. If not, the method ends at state 616. On the other hand, the method proceeds to block 626 and the computer indicates that the associated program thread is not sleeping. Thereafter, at block 628, the computer indicates that the program thread that is not sleeping should be modified. In a particular embodiment, the program thread should be modified so that it automatically sleeps, occasionally, while the electronic device is in the standby mode.

Figure 7:
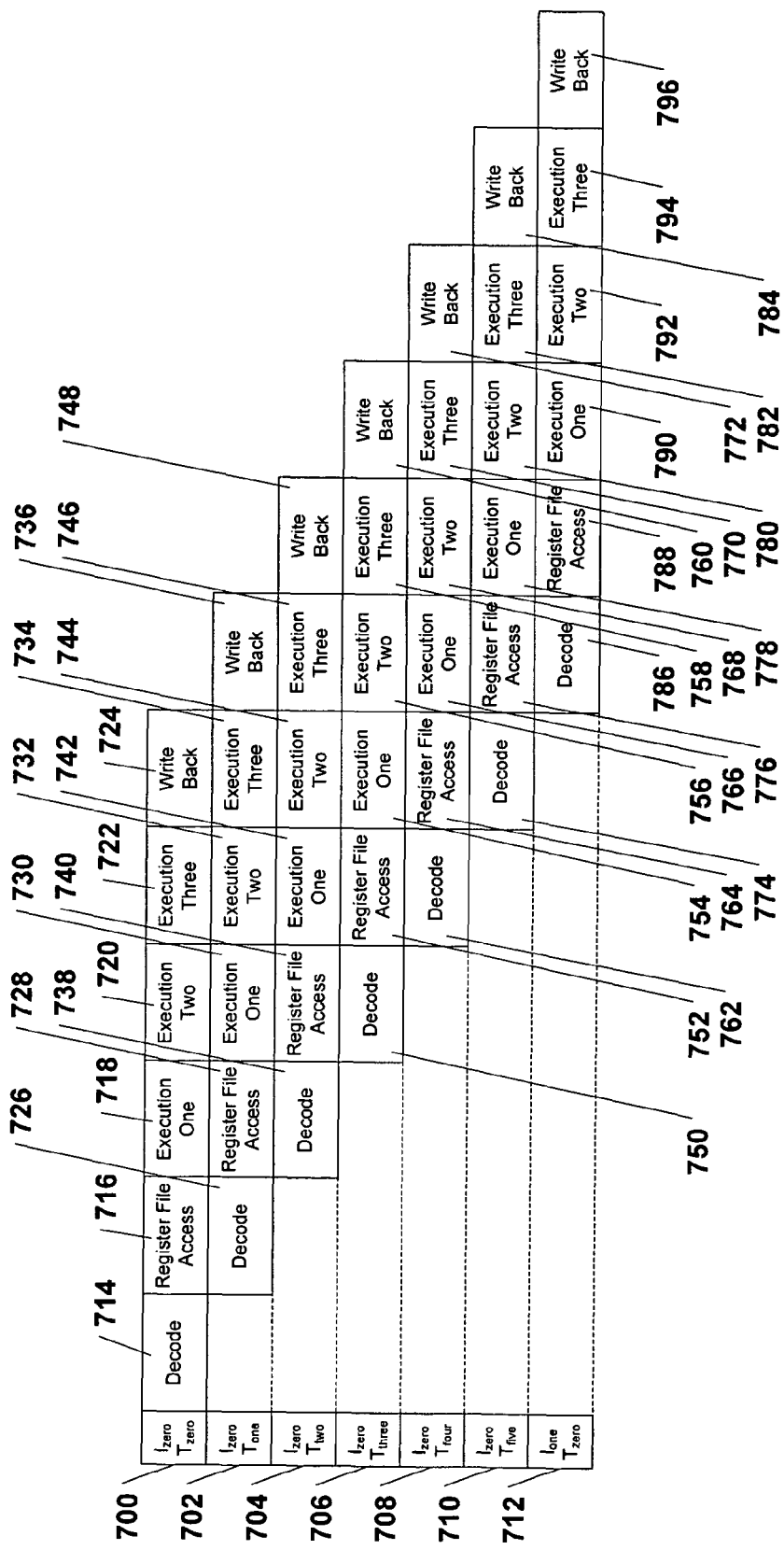
FIG. 7 is a diagram illustrating a multithreading operation of the digital signal processor shown in FIG. 1.

Referring to FIG. 7, a general method of multithreaded operation for a DSP is shown. FIG. 7 shows the method as it is performed for the first instruction of six independent program threads and the second instruction of the first program thread. In particular, FIG. 7 depicts a first instruction of a first program thread 700, a first instruction of a second program thread 702, a first instruction of a third program thread 704, a first instruction of a fourth program thread 706, a first instruction of a fifth program thread 708, a first instruction of a sixth program thread 710, and a second instruction of the first program thread 712.

As depicted in FIG. 7, the first instruction of the first program thread 700 includes a decode step 714, a register file access step 716, a first execution step 718, a second execution step 720, a third execution step 722, and a writeback step 724 for the first instruction of the first program thread 700. The first instruction of the second program thread 702 includes a decode step 726, a register file access step 728, a first execution step 730, a second execution step 732, a third execution step 734, and a writeback step 736. Further, the first instruction of the third program thread 704 includes a decode step 738, a register file access step 740, a first execution step 742, a second execution step 744, a third execution step 746, and a writeback step 748.

In a particular embodiment, the first instruction of the fourth program thread 706 also includes a decode step 750, a register file access step 752, a first execution step 754, a second execution step 756, a third execution step 758, and a writeback step 760. Additionally, as shown in FIG. 7, the first instruction of the fifth program thread 708 includes a decode step 762, a register file access step 764, a first execution step 766, a second execution step 768, a third execution step 770, and a writeback step 772. Moreover, the first instruction of the sixth program thread 710 includes a decode step 774, a register file access step 776, a first execution step 778, a second execution step 780, a third execution step 782, and a writeback step 784. Finally, as depicted in FIG. 7, the second instruction of the first thread 712 includes a decode step 786, a register file access step 788, a first execution step 790, a second execution step 792, a third execution step 794, and a writeback step 796.

In a particular embodiment, as indicated in FIG. 7, the decode step 726 of the first instruction of the second program thread 702 is performed concurrently with the register file access step 716 of the first instruction of the first program thread 700. The decode step 738 of the first instruction of the third program thread 704 is performed concurrently with the register file access step 728 of the first instruction of the second program thread 702 and the first execution step 718 of the first instruction of the first program thread 700. Further, the decode step 750 of the first instruction of the fourth program thread 706 is performed concurrently with the register file access step 740 of the first instruction of the third program thread 704, the first execution step 730 of the first instruction of the second program thread 702, and the second execution step 720 of the first instruction of the first program thread 700.

FIG. 7 further shows that the decode step 762 of the first instruction of the fifth program thread 708 is performed concurrently with the register file access step 752 of the first instruction of the fourth program thread 706, the first execution step 742 of the first instruction of the third program thread 704, the second execution step 732 of the first instruction of the second program thread 702, and the third execution step 722 of the first instruction of the first program thread 700. Additionally, the decode step 774 of the first instruction of the sixth program thread 710 is performed concurrently with the register file access step 764 of the first instruction of the fifth program thread 708, the first execution step 754 of the first instruction of the fourth program thread 706, the second execution step 744 of the first instruction of the third program thread 704, the third execution step 734 of the first instruction of the second program thread 702, and the writeback step 724 of the first instruction of the first program thread 700.

As indicated in FIG. 7, the decode step 786 of the first thread of the second instruction 712 is performed concurrently with the register file access step 776 of the sixth thread of the first instruction 710, the first execution step 766 of the first instruction of the fifth program thread 708, the second execution step 756 of the first instruction of the fourth program thread 706, the third execution step 746 of the first instruction of the third program thread 704, and the writeback step 736 of the first instruction of the second program thread 702.

In a particular embodiment, the decode step, the register file access, step, the first execution step, the second execution step, the third execution step, and the write back step for each of the instructions of the program threads establish instruction pipelines for the program threads. Each pipeline utilizes a number of clock cycles, e.g., six clock cycles, that is less than an instruction issue rate, seven clock cycles, for each program thread stored within the memory unit. For example, a new instruction for the first program thread can issue after an instruction is issued for sixth program thread.

Figure 8:
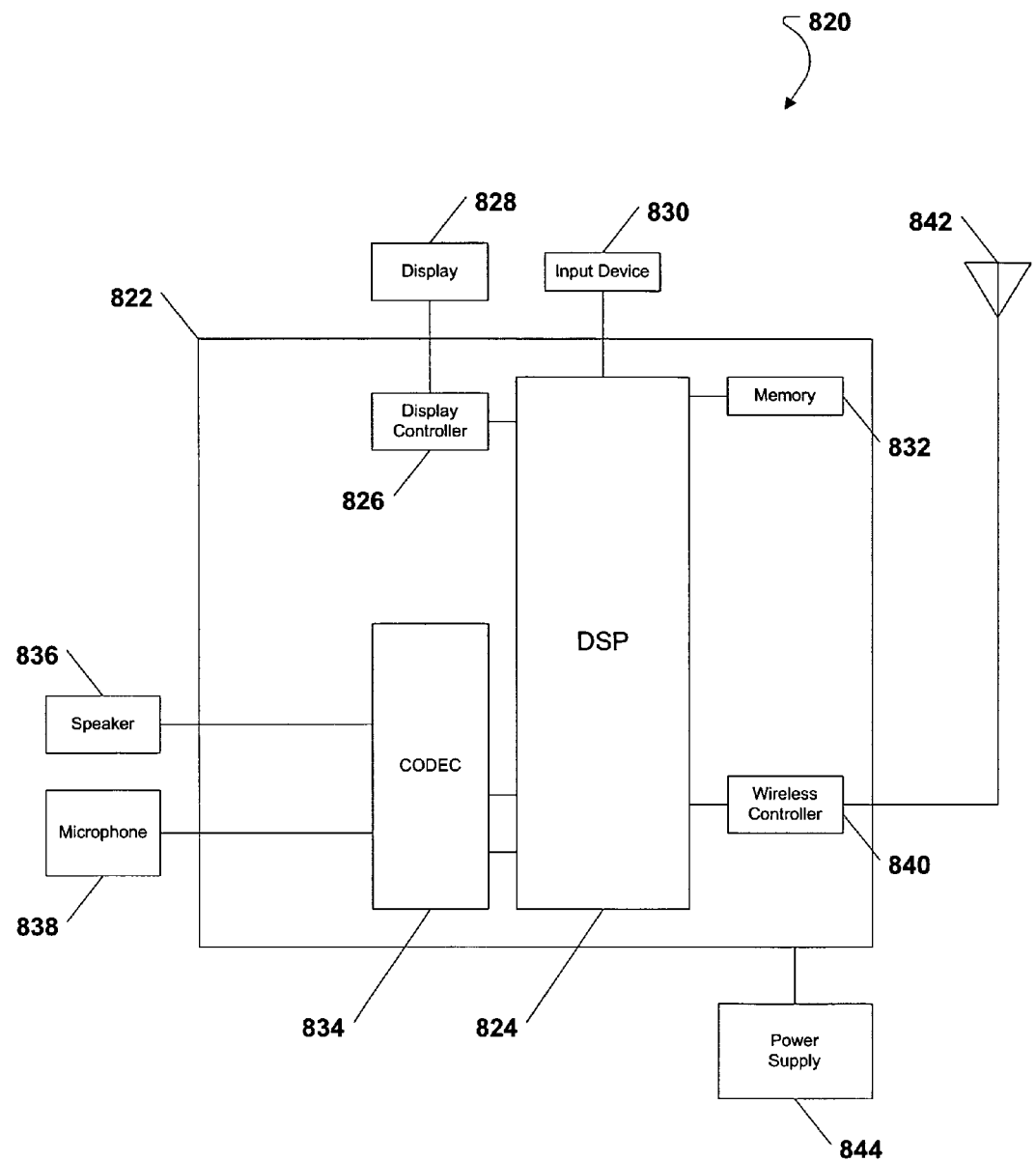
FIG. 8 is a general diagram of a portable communication device incorporating a digital signal processor.

FIG. 8 illustrates an exemplary, non-limiting embodiment of a portable communication device that is generally designated 820. As illustrated in FIG. 8, the portable communication device includes an on-chip system 822 that includes a digital signal processor 824. In a particular embodiment, the digital signal processor 824 is the digital signal processor shown in FIG. 1 and described herein. FIG. 8 also shows a display controller 826 that is coupled to the digital signal processor 824 and a display 828. Moreover, an input device 830 is coupled to the digital signal processor 824. As shown, a memory 832 is coupled to the digital signal processor 824. Additionally, a coder/decoder (CODEC) 834 can be coupled to the digital signal processor 824. A speaker 836 and a microphone 838 can be coupled to the CODEC 830.

FIG. 8 also indicates that a wireless controller 840 can be coupled to the digital signal processor 824 and a wireless antenna 842. In a particular embodiment, a power supply 844 is coupled to the on-chip system 802. Moreover, in a particular embodiment, as illustrated in FIG. 8, the display 826, the input device 830, the speaker 836, the microphone 838, the wireless antenna 842, and the power supply 844 are external to the on-chip system 822. However, each is coupled to a component of the on-chip system 822.

In a particular embodiment, the digital signal processor 824 utilizes interleaved multithreading to process instructions associated with program threads necessary to perform the functionality and operations needed by the various components of the portable communication device 820. For example, when a wireless communication session is established via the wireless antenna a user can speak into the microphone 838. Electronic signals representing the user's voice can be sent to the CODEC 834 to be encoded. The digital signal processor 824 can perform data processing for the CODEC 834 to encode the electronic signals from the microphone. Further, incoming signals received via the wireless antenna 842 can be sent to the CODEC 834 by the wireless controller 840 to be decoded and sent to the speaker 836. The digital signal processor 824 can also perform the data processing for the CODEC 834 when decoding the signal received via the wireless antenna 842.

Further, before, during, or after the wireless communication session, the digital signal processor 824 can process inputs that are received from the input device 830. For example, during the wireless communication session, a user may be using the input device 830 and the display 828 to surf the Internet via a web browser that is embedded within the memory 832 of the portable communication device 820. The digital signal processor 824 can interleave various program threads that are used by the input device 830, the display controller 826, the display 828, the CODEC 834 and the wireless controller 840, as described herein, to efficiently control the operation of the portable communication device 820 and the various components therein. Many of the instructions associated with the various program threads are executed concurrently during one or more clock cycles. As such, the power and energy consumption due to wasted clock cycles may be substantially decreased. Further, using one or more of the method described above global resources within the digital signal processor can be powered off when the portable communication device goes into a standby mode. Thus, power leakage is reduced.

Figure 9:
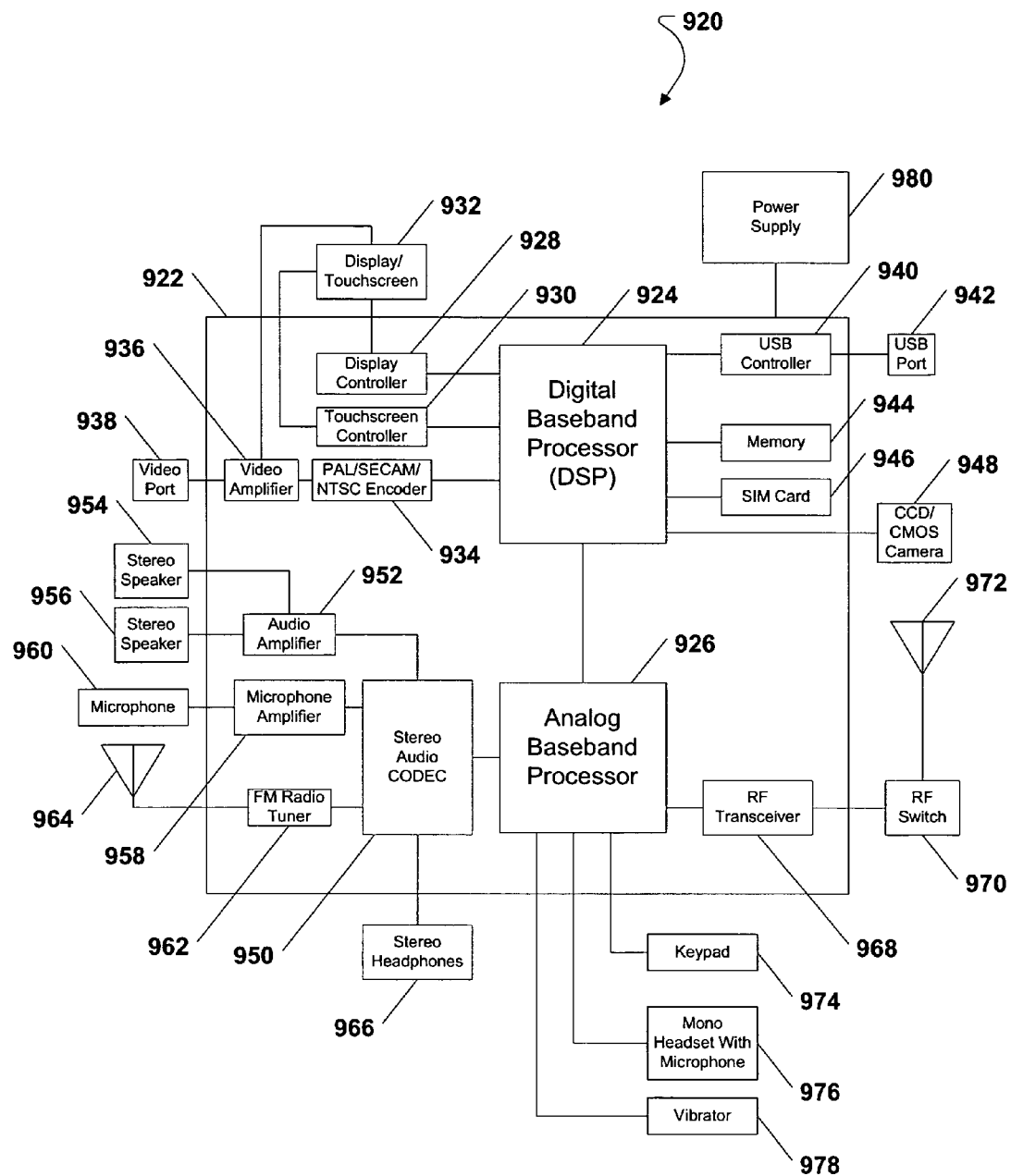
FIG. 9 is a general diagram of an exemplary cellular telephone incorporating a digital signal processor.

Referring to FIG. 9, an exemplary, non-limiting embodiment of a cellular telephone is shown and is generally designated 920. As shown, the cellular telephone 920 includes an on-chip system 922 that includes a digital baseband processor 924 and an analog baseband processor 926 that are coupled together. In a particular embodiment, the digital baseband processor 924 is a digital signal processor, e.g., the digital signal processor shown in FIG. 1 and described herein. As illustrated in FIG. 9, a display controller 928 and a touchscreen controller 930 are coupled to the digital baseband processor 924. In turn, a touchscreen display 932 external to the on-chip system 922 is coupled to the display controller 928 and the touchscreen controller 930.

FIG. 9 further indicates that a video encoder 934, e.g., a phase alternating line (PAL) encoder, a sequential couleur a memoire (SECAM) encoder, or a national television system(s) committee (NTSC) encoder, is coupled to the digital baseband processor 924. Further, a video amplifier 936 is coupled to the video encoder 934 and the touchscreen display 932. Also, a video port 938 is coupled to the video amplifier 936. As depicted in FIG. 9, a universal serial bus (USB) controller 940 is coupled to the digital baseband processor 924. Also, a USB port 942 is coupled to the USB controller 940. A memory 944 and a subscriber identity module (SIM) card 946 can also be coupled to the digital baseband processor 924. Further, as shown in FIG. 9, a digital camera 948 can be coupled to the digital baseband processor 924. In an exemplary embodiment, the digital camera 948 is a charge-coupled device (CCD) camera or a complementary metal-oxide semiconductor (CMOS) camera.

As further illustrated in FIG. 9, a stereo audio CODEC 950 can be coupled to the analog baseband processor 926. Moreover, an audio amplifier 952 can coupled to the to the stereo audio CODEC 950. In an exemplary embodiment, a first stereo speaker 954 and a second stereo speaker 956 are coupled to the audio amplifier 952. FIG. 9 shows that a microphone amplifier 958 can be also coupled to the stereo audio CODEC 950. Additionally, a microphone 960 can be coupled to the microphone amplifier 958. In a particular embodiment, a frequency modulation (FM) radio tuner 962 can be coupled to the stereo audio CODEC 950. Also, an FM antenna 964 is coupled to the FM radio tuner 962. Further, stereo headphones 966 can be coupled to the stereo audio CODEC 950.

FIG. 9 further indicates that a radio frequency (RF) transceiver 968 can be coupled to the analog baseband processor 926. An RF switch 970 can be coupled to the RF transceiver 968 and an RF antenna 972. As shown in FIG. 9, a keypad 974 can be coupled to the analog baseband processor 926. Also, a mono headset with a microphone 976 can be coupled to the analog baseband processor 926. Further, a vibrator device 978 can be coupled to the analog baseband processor 926. FIG. 9 also shows that a power supply 980 can be coupled to the on-chip system 922. In a particular embodiment, the power supply 980 is a direct current (DC) power supply that provides power to the various components of the cellular telephone 920 that require power. Further, in a particular embodiment, the power supply is a rechargeable DC battery or a DC power supply that is derived from an alternating current (AC) to DC transformer that is connected to an AC power source.

In a particular embodiment, as depicted in FIG. 9, the touchscreen display 932, the video port 938, the USB port 942, the camera 948, the first stereo speaker 954, the second stereo speaker 956, the microphone, the FM antenna 964, the stereo headphones 966, the RF switch 970, the RF antenna 972, the keypad 974, the mono headset 976, the vibrator 978, and the power supply 980 are external to the on-chip system 922. Moreover, in a particular embodiment, the digital baseband processor 924 can use interleaved multithreading, described herein, in order to process the various program threads associated with one or more of the different components associated with the cellular telephone 920. Further, using one or more of the method described above global resources within the digital signal processor can be powered off when the portable communication device goes into a standby mode. Thus, power leakage is reduced.

Figure 10:
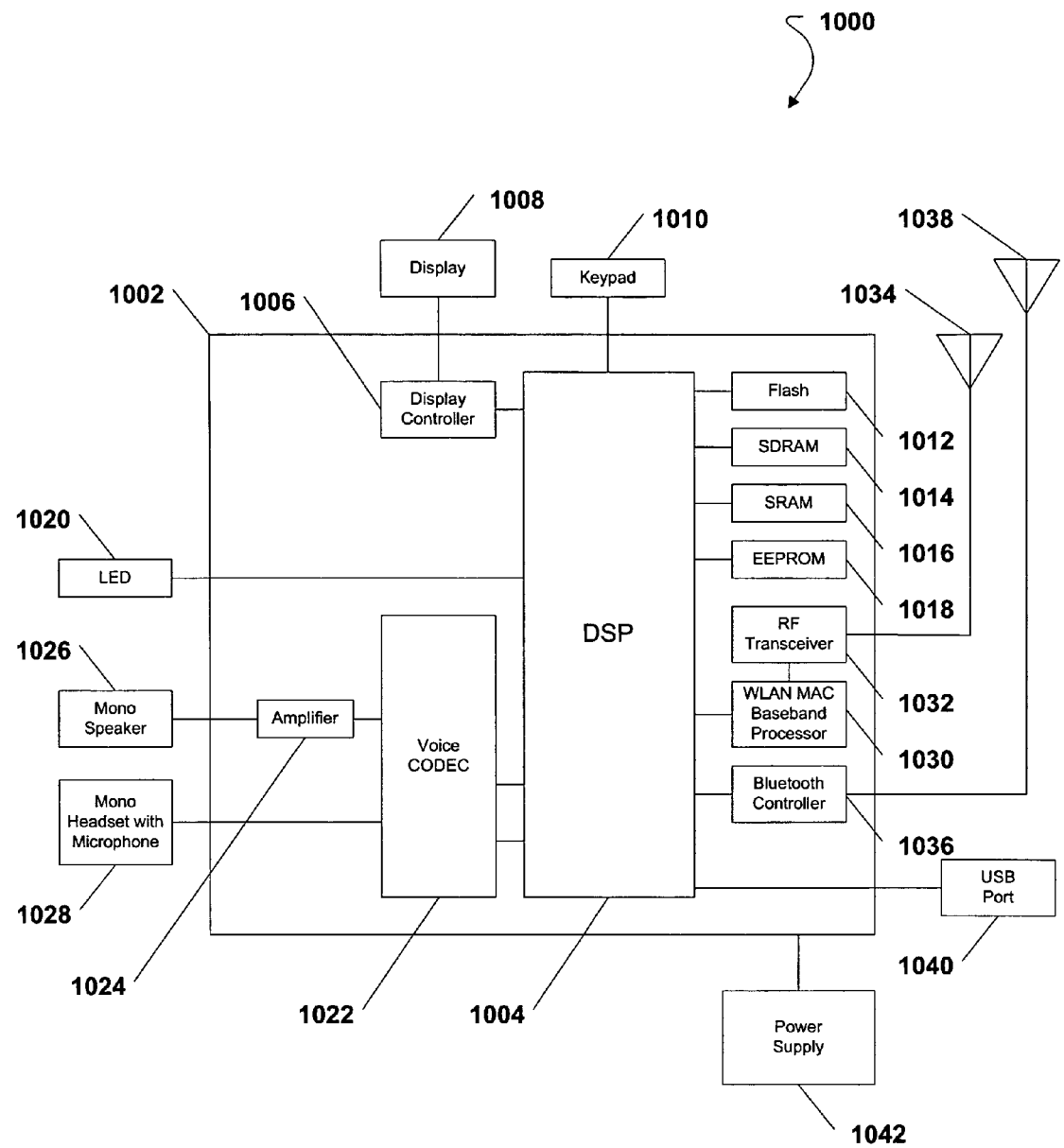
FIG. 10 is a general diagram of an exemplary wireless Internet Protocol telephone incorporating a digital signal processor.

Referring to FIG. 10, an exemplary, non-limiting embodiment of a wireless Internet protocol (IP) telephone is shown and is generally designated 1000. As shown, the wireless IP telephone 1000 includes an on-chip system 1002 that includes a digital signal processor (DSP) 1004. In a particular embodiment, the DSP 1004 is the digital signal processor shown in FIG. 1 and described herein. As illustrated in FIG. 10, a display controller 1006 is coupled to the DSP 1004 and a display 1008 is coupled to the display controller 1006. In an exemplary embodiment, the display 1008 is a liquid crystal display (LCD). FIG. 10 further shows that a keypad 1010 can be coupled to the DSP 1004.

As further depicted in FIG. 10, a flash memory 1012 can be coupled to the DSP 1004. A synchronous dynamic random access memory (SDRAM) 1014, a static random access memory (SRAM) 1016, and an electrically erasable programmable read only memory (EEPROM) 1018 can also be coupled to the DSP 1004. FIG. 10 also shows that a light emitting diode (LED) 1020 can be coupled to the DSP 1004. Additionally, in a particular embodiment, a voice CODEC 1022 can be coupled to the DSP 1004. An amplifier 1024 can be coupled to the voice CODEC 1022 and a mono speaker 1026 can be coupled to the amplifier 1024. FIG. 10 further indicates that a mono headset 1028 can also be coupled to the voice CODEC 1022. In a particular embodiment, the mono headset 1028 includes a microphone.

FIG. 10 also illustrates that a wireless local area network (WLAN) baseband processor 1030 can be coupled to the DSP 1004. An RF transceiver 1032 can be coupled to the WLAN baseband processor 1030 and an RF antenna 1034 can be coupled to the RF transceiver 1032. In a particular embodiment, a Bluetooth controller 1036 can also be coupled to the DSP 1004 and a Bluetooth antenna 1038 can be coupled to the controller 1036. FIG. 10 also shows that a USB port 1040 can also be coupled to the DSP 1004. Moreover, a power supply 1042 is coupled to the on-chip system 1002 and provides power to the various components of the wireless IP telephone 1000 via the on-chip system 1002.

In a particular embodiment, as indicated in FIG. 10, the display 1008, the keypad 1010, the LED 1020, the mono speaker 1026, the mono headset 1028, the RF antenna 1034, the Bluetooth antenna 1038, the USB port 1040, and the power supply 1042 are external to the on-chip system 1002. However, each of these components is coupled to one or more components of the on-chip system. Further, in a particular embodiment, the digital signal processor 1004 can use interleaved multithreading, as described herein, in order to process the various program threads associated with one or more of the different components associated with the IP telephone 1000.

Figure 11:
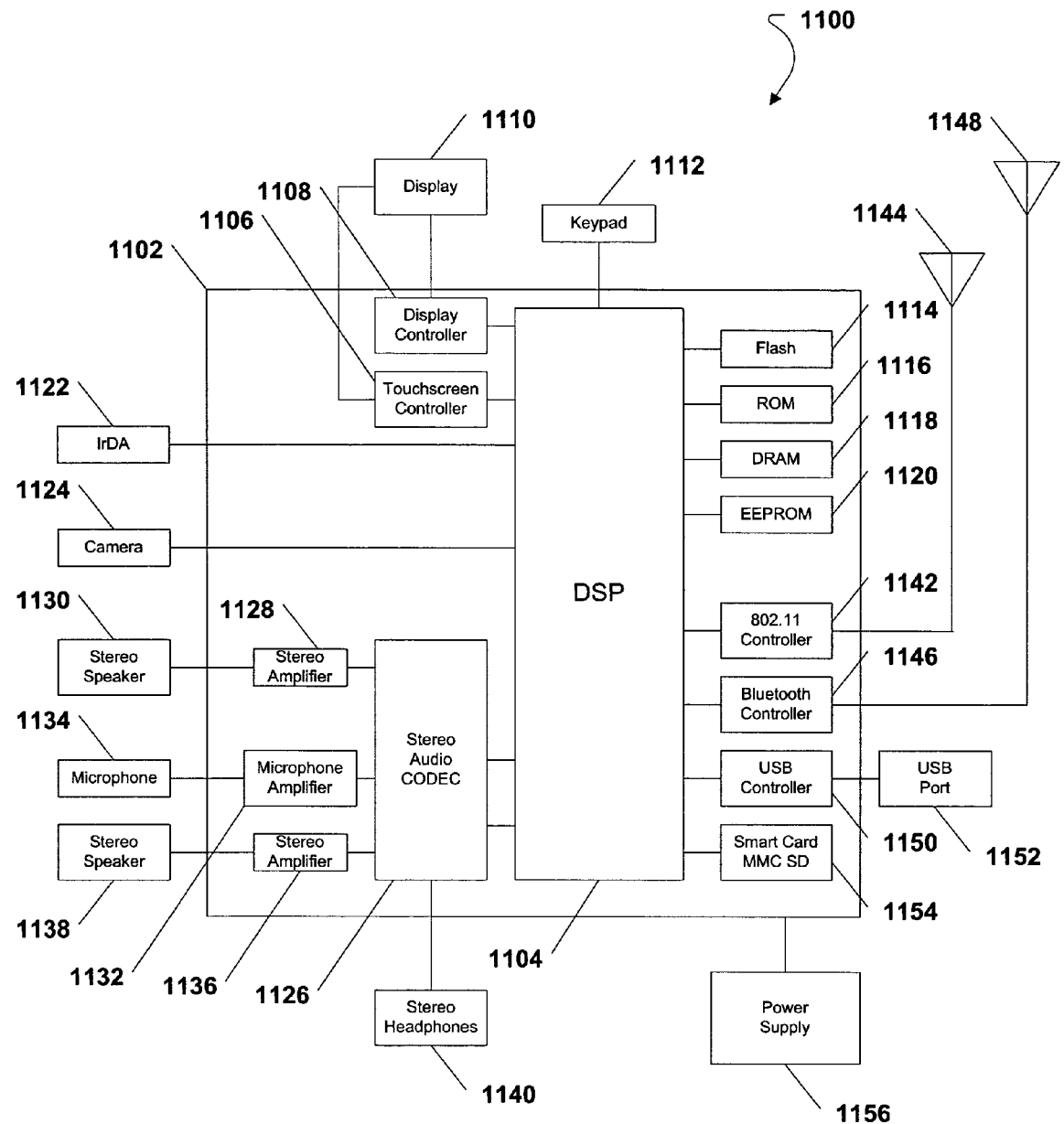
FIG. 11 is a general diagram of an exemplary portable digital assistant incorporating a digital signal processor.

FIG. 11 illustrates an exemplary, non-limiting embodiment of a portable digital assistant (PDA) that is generally designated 1100. As shown, the PDA 1100 includes an on-chip system 1102 that includes a digital signal processor (DSP) 1104. In a particular embodiment, the DSP 1104 is the digital signal processor shown in FIG. 1 and described herein. As depicted in FIG. 11, a touchscreen controller 1106 and a display controller 1108 are coupled to the DSP 1104. Further, a touchscreen display is coupled to the touchscreen controller 1106 and to the display controller 1108. FIG. 11 also indicates that a keypad 1112 can be coupled to the DSP 1104.

As further depicted in FIG. 11, a flash memory 1114 can be coupled to the DSP 1104. Also, a read only memory (ROM) 1116, a dynamic random access memory (DRAM) 1118, and an electrically erasable programmable read only memory (EEPROM) 1120 can be coupled to the DSP 1104. FIG. 11 also shows that an infrared data association (IrDA) port 1122 can be coupled to the DSP 1104. Additionally, in a particular embodiment, a digital camera 1124 can be coupled to the DSP 1104.

As shown in FIG. 11, in a particular embodiment, a stereo audio CODEC 1126 can be coupled to the DSP 1104. A first stereo amplifier 1128 can be coupled to the stereo audio CODEC 1126 and a first stereo speaker 1130 can be coupled to the first stereo amplifier 1128. Additionally, a microphone amplifier 1132 can be coupled to the stereo audio CODEC 1126 and a microphone 1134 can be coupled to the microphone amplifier 1132. FIG. 11 further shows that a second stereo amplifier 1136 can be coupled to the stereo audio CODEC 1126 and a second stereo speaker 1138 can be coupled to the second stereo amplifier 1136. In a particular embodiment, stereo headphones 1140 can also be coupled to the stereo audio CODEC 1126.

FIG. 11 also illustrates that an 802.11 controller 1142 can be coupled to the DSP 1104 and an 802.11 antenna 1144 can be coupled to the 802.11 controller 1142. Moreover, a Bluetooth controller 1146 can be coupled to the DSP 1104 and a Bluetooth antenna 1148 can be coupled to the Bluetooth controller 1146. As depicted in FIG. 11, a USB controller 1150 can be coupled to the DSP 1104 and a USB port 1152 can be coupled to the USB controller 1150. Additionally, a smart card 1154, e.g., a multimedia card (MMC) or a secure digital card (SD) can be coupled to the DSP 1104. Further, as shown in FIG. 11, a power supply 1156 can be coupled to the on-chip system 1102 and can provide power to the various components of the PDA 1100 via the on-chip system 1102.

In a particular embodiment, as indicated in FIG. 11, the display 1110, the keypad 1112, the IrDA port 1122, the digital camera 1124, the first stereo speaker 1130, the microphone 1134, the second stereo speaker 1138, the stereo headphones 1140, the 802.11 antenna 1144, the Bluetooth antenna 1148, the USB port 1152, and the power supply 1150 are external to the on-chip system 1102. However, each of these components is coupled to one or more components on the on-chip system. Additionally, in a particular embodiment, the digital signal processor 1104 can use interleaved multithreading, described herein, in order to process the various program threads associated with one or more of the different components associated with the portable digital assistant 1100. Further, using one or more of the method described above global resources within the digital signal processor can be powered off when the portable communication device goes into a standby mode. Thus, power leakage is reduced.

Figure 12:
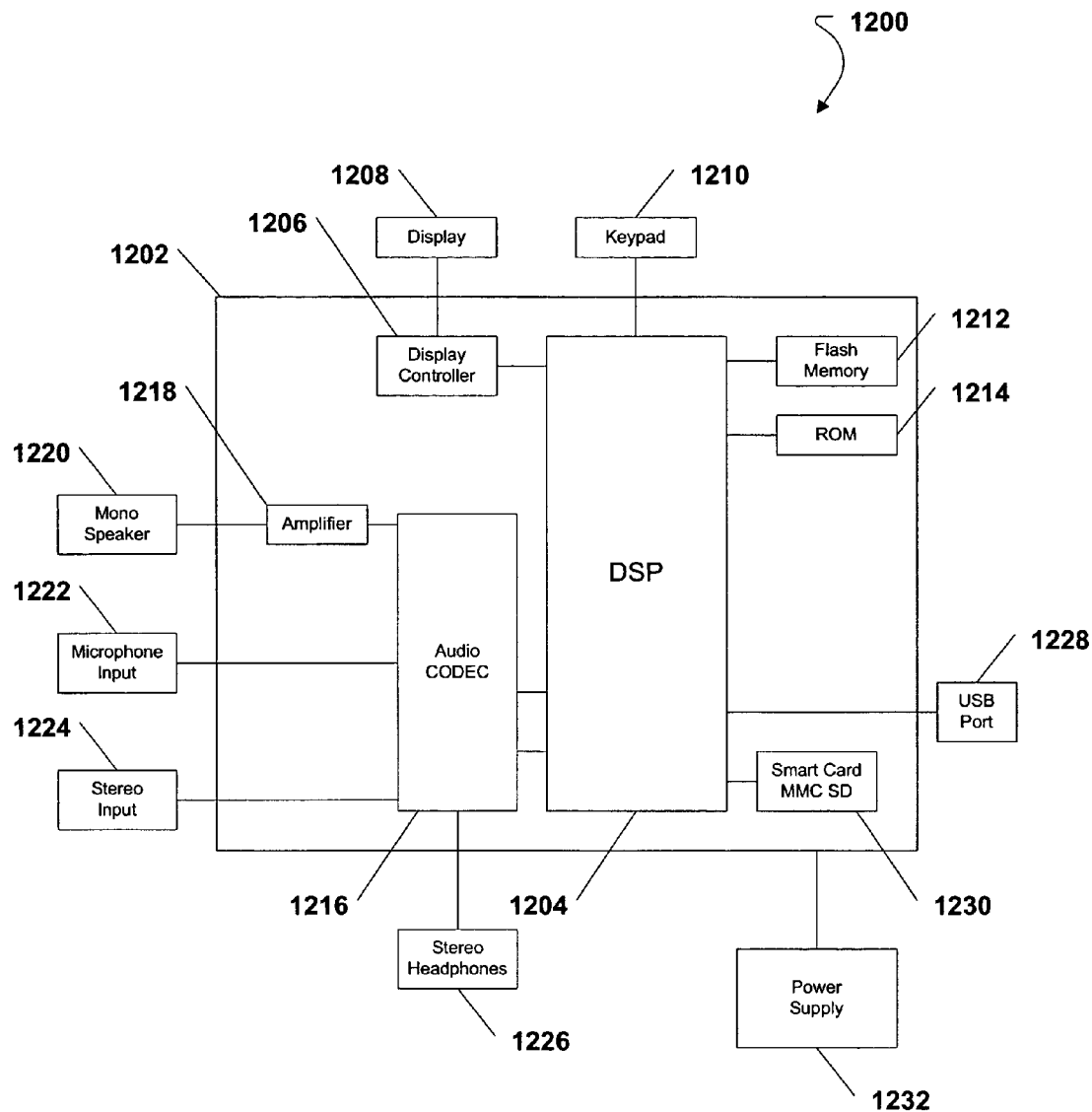
FIG. 12 is a general diagram of an exemplary audio file player incorporating a digital signal processor.

Referring to FIG. 12, an exemplary, non-limiting embodiment of an audio file player, such as moving pictures experts group audio layer-3 (MP3) player is shown and is generally designated 1200. As shown, the audio file player 1200 includes an on-chip system 1202 that includes a digital signal processor (DSP) 1204. In a particular embodiment, the DSP 1204 is the digital signal processor shown in FIG. 1 and described herein. As illustrated in FIG. 12, a display controller 1206 is coupled to the DSP 1204 and a display 1208 is coupled to the display controller 1206. In an exemplary embodiment, the display 1208 is a liquid crystal display (LCD). FIG. 12 further shows that a keypad 1210 can be coupled to the DSP 1204.

As further depicted in FIG. 12, a flash memory 1212 and a read only memory (ROM) 1214 can be coupled to the DSP 1204. Additionally, in a particular embodiment, an audio CODEC 1216 can be coupled to the DSP 1204. An amplifier 1218 can be coupled to the audio CODEC 1216 and a mono speaker 1220 can be coupled to the amplifier 1218. FIG. 12 further indicates that a microphone input 1222 and a stereo input 1224 can also be coupled to the audio CODEC 1216. In a particular embodiment, stereo headphones 1226 can also be coupled to the audio CODEC 1216.

FIG. 12 also indicates that a USB port 1228 and a smart card 1230 can be coupled to the DSP 1204. Additionally, a power supply 1232 can be coupled to the on-chip system 1202 and can provide power to the various components of the audio file player 1200 via the on-chip system 1202.

In a particular embodiment, as indicated in FIG. 12, the display 1208, the keypad 1210, the mono speaker 1220, the microphone input 1222, the stereo input 1224, the stereo headphones 1226, the USB port 1228, and the power supply 1232 are external to the on-chip system 1202. However, each of these components is coupled to one or more components on the on-chip system. Also, in a particular embodiment, the digital signal processor 1204 can use interleaved multithreading, described herein, in order to process the various program threads associated with one or more of the different components associated with the audio file player 1200. Further, using one or more of the method described above global resources within the digital signal processor can be powered off when the portable communication device goes into a standby mode. Thus, power leakage is reduced.

With the configuration of structure disclosed herein, the system and method of controlling power in a multi-threaded processor provides a way to reduce power leakage when a device in which the multi-threaded processor is incorporated is in a standby mode. Further, the system and method provides a way to control the power to multiple components within the multi-threaded processor or coupled to the multi-threaded processor in response to state signals associated with each thread of the multi-threaded processor. Additionally, the system and method described herein provides a way to debug a multi-threaded processor. For example, if the multi-threaded processor does not output a global power off signal, an indication can be provided to a user that one or more program threads within the multi-threaded process is not sleeping. Accordingly, the program thread that is not sleeping can be modified so that it does sleep while the device is in standby mode.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features as defined by the following claims.

What is claimed is:

1. A multithreaded processor device comprising:
a plurality of execution units to execute a plurality of program threads;
one or more global resources shared by the plurality of program threads; and
a global low power detection circuit comprising:
a plurality of inputs responsive to the plurality of program threads, the plurality of inputs indicating an execution activity level of each of the plurality of program threads;
logic operative to evaluate the execution activity level of each of the plurality of program threads, wherein the logic is further operative to generate a power level signal based on an evaluated execution activity level of a particular thread of the plurality of program threads; and
an output responsive to the power level signal, wherein the output selectively controls an amount of power provided to the one or more global resources based on the power level signal, and wherein the one or more global resources do not include any of the plurality of execution units,
wherein the global low power detection circuit outputs a global power off signal when the plurality of inputs indicates that each of the plurality of program threads will remain in a sleep mode for a number of cycles that exceeds a threshold.

2. The multithreaded processor device of claim 1, wherein the output turns off power to at least one global resource of the one or more global resources in response to a determination that the power level signal indicates the particular thread is entering the sleep mode.

3. The multithreaded processor device of claim 1, wherein a first number of clock cycles that a first program thread of the plurality of program threads is to remain in the sleep mode is stored in a register.

4. The multithreaded processor device of claim 1, wherein the global power off signal turns off power provided to the one or more global resources.

5. The multithreaded processor device of claim 1, wherein each of a number of clock cycles that indicates a duration of the sleep mode for each of the program threads is determined by a program control.

6. The multithreaded processor device of claim 1, further comprising:
a memory, wherein a plurality of instructions for each of the plurality of program threads is stored within the memory; and
a sequencer coupled to the memory, wherein the sequencer fetches the plurality of instructions for each of the plurality of program threads from the memory and provides the plurality of instructions to at least one of the plurality of execution units.

7. The multithreaded processor device of claim 6, wherein the sequencer supports very long instruction word (VLIW) type instructions.

8. The multithreaded processor device of claim 6, wherein the sequencer supports execution of superscalar type instructions.

9. The multithreaded processor device of claim 1, wherein at least one of the plurality of execution units is a multiplication and accumulation (MAC) type execution unit.

10. The multithreaded processor device of claim 1, wherein at least one of the plurality of execution units is a data load type instruction execution unit.

11. The multithreaded processor device of claim 1, wherein the one or more global resources shared by the plurality of program threads include at least one of an instruction cache, a data cache, and a clock tree, and wherein the at least one of the instruction cache, the data cache, and the clock tree is powered down responsive to the execution activity levels of the plurality of program threads.

12. The multithreaded processor device of claim 1, wherein the global power detection circuit is further configured to determine for each of the plurality of program threads an interval during which the program thread will be in a sleep mode, and wherein the global power detection circuit is further configured to power down at least one of the one or more global resources in response to determining that at least one of the intervals is greater than a predetermined threshold.

13. The multithreaded processor device of claim 1, further comprising a switch coupled to the one or more global resources and to the output of the global low power detection circuit.

14. The multithreaded processor device of claim 13, wherein the switch is responsive to the output of the global low power detection circuit.

15. The multithreaded processor device of claim 13, wherein the switch selectively turns off power provided to the one or more global resources.

16. The multithreaded processor device of claim 1, further comprising a plurality of switches, wherein each switch of the plurality of switches is coupled to the output of the global low power detection circuit and to a corresponding global resource of the one or more global resources.

17. The multithreaded processor device of claim 16, wherein each switch of the plurality of switches is responsive to the output of the global low power detection circuit.

18. The multithreaded processor device of claim 16, wherein each switch of the plurality of switches selectively turns off power provided to the one or more global resources.

19. The multithreaded processor device of claim 1, further comprising one or more local resources.

20. The multithreaded processor device of claim 19, wherein each of the plurality of program threads utilizes at least one of the one or more local resources.

21. The multithreaded processor device of claim 1, further comprising one or more input/output pins coupled to the output of the global low power detection circuit.

22. The multithreaded processor device of claim 21, further comprising one or more peripheral devices coupled to the one or more input/output pins.

23. The multithreaded processor device of claim 22, wherein the output selectively controls a second amount of power provided to the one or more peripheral devices based on the power level signal.

24. The multithreaded processor device of claim 22, wherein the output turns off power provided to the one or more peripheral devices in response to a determination that each of the plurality of program threads is in the sleep mode.

25. A multithreaded processor device comprising:
a plurality of global resources;
a plurality of program threads, wherein each of the plurality of program threads utilizes at least one of the plurality of global resources; and
a global low power detection circuit coupled to the plurality of global resources, the global low power detection circuit responsive to the plurality of program threads in order to turn off power to one or more of the plurality of global resources when each of the plurality of program threads will remain in a sleep mode for a number of cycles that exceeds a threshold.

26. The multithreaded processor device of claim 25, wherein the global low power detection circuit comprises:
an input responsive to each of the plurality program threads; and
an output to the plurality of global resources, wherein the global low power detection circuit selectively controls the power to the plurality of global resources based on information received via the input.

27. The multithreaded processor device of claim 25, further comprising a single, centralized switch, wherein the single, centralized switch is coupled to the plurality of global resources and is responsive to an output from the global low power detection circuit to selectively turn off the power to the plurality of global resources.

28. The multithreaded processor device of claim 25, further comprising a plurality of distributed switches, wherein each of the plurality of distributed switches is coupled to at least one of the plurality of global resources and wherein each of the plurality of distributed switches is responsive to a global power off signal from the global low power detection circuit to turn off the power to the plurality of global resources.

29. A method of controlling power within a multithreaded processor, the method comprising:
receiving a plurality of state signals indicating activity levels associated with a plurality of program threads when a device that incorporates the multithreaded processor is in a standby mode, wherein the state signals indicate whether each of the plurality of program threads is in a sleep mode; and
turning off power applied to one or more global resources shared by the plurality of program threads based on each of the state signals, wherein turning off the power to the one or more global resources is based on the state signals indicating that each of the plurality of programs threads is entering the sleep mode and wherein the power to the one or more global resources is turned off after determining that a lowest number of clock cycles for which any of the program threads is to sleep is above a threshold.

30. The method of claim 29, wherein each of the state signals is either true or false.

31. The method of claim 29, wherein the power to the one or more global resources is turned off when the state signals corresponding to each of the plurality of program threads are each true indicating that all of the program threads have entered a sleep mode.

32. The method of claim 29, wherein the lowest number of clock cycles that indicate a duration of the sleep mode for each of the threads is determined by a program control.

33. The method of claim 29, wherein a first number of clock cycles that a first program thread of the plurality of program threads is to remain in the sleep mode is stored in a register.

34. The method of claim 29, wherein at least one of the one or more global resources is usable by each of the plurality of program threads.

35. The method of claim 29, wherein the one or more global resources include at least one of data caches, instruction caches, and clock trees.

36. The method of claim 29, further comprising determining whether an interrupt request for a first program thread of the plurality of program threads is received.

37. The method of claim 36, further comprising maintaining the one or more global resources in a power off state in response to a determination that an interrupt request for a first program thread of the plurality of program threads has not been received.

38. The method of claim 36, further comprising turning on the one or more global resources in response to a determination that an interrupt request for a first program thread of the plurality of program threads has been received.

39. The method of claim 29, wherein the one or more global resources are turned off via a global power off signal outputted from a global low power detection circuit.

40. A portable communication device, comprising:
a digital signal processor;
a peripheral device external to and coupled to the digital signal processor; and
wherein the digital signal processor includes:
a plurality of program threads;
a plurality of global resources shared by the plurality of program threads; and
a global low power detection circuit operative to receive a plurality of input signals, wherein each input signal of the plurality of input signals corresponds to an activity level associated with a corresponding program thread of the plurality of program threads, wherein the global low power detection circuit is further operative to output a global power off signal to turn off power to the plurality of global resources shared by the plurality of program threads based on the plurality of input signals when the input signals indicate that each of the plurality of program threads is in a sleep mode, wherein the global low power detection circuit outputs a global power off signal when the plurality of inputs indicates that each of the plurality of program threads will remain in a sleep mode for a number of cycles that exceeds a threshold, and wherein the digital signal processor outputs a system power off signal to the peripheral device.

41. The portable communication device of claim 40, wherein the system power off signal is outputted when power to the global resources is turned off.

42. The portable communication device of claim 40, wherein the peripheral device is a voice coder/decoder (CODEC).

43. The portable communication device of claim 40, further comprising at least one input/output pin that is powered off in response to the system power off signal.

44. The portable communication device of claim 43, wherein the peripheral device is coupled to the digital signal processor via the at least one input/output pin.

45. The portable communication device of claim 40, wherein the peripheral device comprises at least one of a display controller and a touch screen controller.

46. The portable communication device of claim 40, wherein the peripheral device comprises at least one of a universal serial bus controller, a modulator/demodulator (MODEM) for wireless communications, a memory, and an input device.

47. A global low power detection circuit within a multi-threaded processor, comprising:
means for receiving a plurality of inputs, wherein each input of the plurality of inputs indicates an activity level associated with a program thread of a plurality of program threads when a device that incorporates the multi-threaded processor is in a standby mode, wherein the plurality of inputs indicates whether an associated program thread is in a sleep mode; and
means for turning off power applied to one or more global resources associated with the plurality of program threads based on the input associated with the plurality of program threads, wherein the means for turning off power outputs a global power off signal when the plurality of inputs indicates that each of the plurality of program threads will remain in a sleep mode for a number of cycles that exceeds a threshold.

* * * * *